United States Patent
Söderkvist

Patent Number: 5,914,990
Date of Patent: Jun. 22, 1999

[54] FILTERING IN A RECEIVER THAT USES LOG-POLAR SIGNAL PROCESSING

[75] Inventor: Jan Erik Söderkvist, Enebyberg, Sweden

[73] Assignee: Telefonaktiebolaget LM Ericsson, Stockholm, Sweden

[21] Appl. No.: 08/561,746

[22] Filed: Nov. 22, 1995

[51] Int. Cl.⁶ .................................................. H04B 1/10
[52] U.S. Cl. ........................ 375/350; 375/235; 364/724.2
[58] Field of Search .................................. 375/350, 346, 375/229, 230, 232, 233, 235; 364/724.01, 724.19, 724.2

[56] References Cited

U.S. PATENT DOCUMENTS

| 5,048,059 | 9/1991 | Dent | 375/349 |
| 5,533,064 | 7/1996 | Ichihara | 375/346 |
| 5,668,837 | 9/1997 | Dent | 375/316 |

FOREIGN PATENT DOCUMENTS

A-0320918  6/1989  European Pat. Off. .
A-0395368  10/1990  European Pat. Off. .

Primary Examiner—Don N. Vo
Attorney, Agent, or Firm—Burns, Doane, Swecker & Mathis, L.L.P.

[57] ABSTRACT

A log polar digital filter for processing a digitized log polar signal that is a magnitude signal ($r_{in}$) and an angle signal ($PHI_{in}$), has a first converter for converting the log polar signal into a converted linear Cartesian signal that includes an in-phase signal ($I_{in}$) and a quadrature signal ($Q_{in}$). A linear Cartesian digital filter, coupled to the first converter, generates a filtered linear Cartesian signal from the converted linear Cartesian signal. The first converter may adapt a linearization of $r_{in}$ and compensate for gain errors introduced in an analog circuit that supplies a signal from which the digitized log polar signal is derived. In another feature, a second converter may also be provided for converting the filtered linear Cartesian signal into a filtered log polar signal that includes a filtered magnitude signal ($r_{filt}$) and a filtered angle signal ($PHI_{filt}$).

22 Claims, 4 Drawing Sheets

FILTERING IN A RECEIVER THAT USES LOG-POLAR SIGNAL PROCESSING

BACKGROUND

The present invention relates to filtering of radio frequency signals, and more particularly to digital techniques for filtering radio frequency signals that are supplied in log-polar format.

In the telecommunications arts, such as in mobile telephony, it is known that it is always possible to represent an arbitrary radio signal as a sequence of composite (complex) vectors. Thus, a radio signal can be expressed either in Cartesian (I, Q) form or in polar (RSS, PHI) form, where RSS is the received signal strength, and PHI represents the phase angle of the vector. It is also known that a so-called "log polar form" can be advantageously used as an alternative to the two forms mentioned above.

FIG. 1 is a block diagram of a conventional log polar receiver. A radio signal is received by an antenna 101 and supplied to an amplifier 103. The amplified signal is then supplied to a mixer 105, where it is mixed with a signal generated by a local oscillator 107 to produce a signal having a suitable intermediate frequency ("I.F. signal"). The I.F. signal is then supplied to a bandpass filter whose purpose is to pass only those frequencies that lie within the range of a bandwidth centered around a predefined center frequency.

After further amplification by amplifier 111, the analog I.F. signal 113 is supplied to a log polar digitizer 127. In a first leg of the log polar digitizer 127, the analog I.F. signal 113 is amplified by a logarithmic amplifier 115 and then converted to a digital form by the analog-to-digital (A/D) converter 117. Each output of the A/D converter 117 represents the log of the received signal strength (rss 119) at a particular instant in time.

In another leg of the log polar digitizer 17, the analog I.F. signal 113 is supplied to a phase digitizer 121, which generates a digital signal, PHI 123, which represents the phase of the applied analog I.F. signal 113.

The digital signals rss 119 and PHI 123, which are generated by the log polar digitizer 127, are then supplied to a demodulator 125 which processes these signals using known digital techniques to generate a demodulated signal.

The performance of the bandpass filter 109 is important because it determines the extent to which the receiver will respond to all frequencies within the defined channel, and reject (i.e., not respond to) all frequencies falling outside the channel. FIG. 2 is a graph of the frequency characteristics of the bandpass filter 109. The bandpass filter 109 is designed to pass only those frequency components of the input signal that lie in the range from $f_{CENTER}-A$ to $f_{CENTER}+B$. In the illustrated example, $f_{CENTER}$ is selected to be a desired I.F. for the receiver circuit.

In the conventional receiver, the bandpass filter 109 is constructed entirely from analog components. This introduces a number of problems due to imperfections and variations of components during construction as well as variations that arise as a result of aging of the components. For example, referring to FIG. 2, the filter's bandwidth, A+B, may be too wide. This results in signals from adjacent channels being passed on to the demodulator. or, the filter's bandwidth, A+B, may be too narrow. This results in loss of performance at the desired channel due to parts of the desired signal being removed. Also, it is possible that the center frequency, $F_{CENTER}$, is incorrect, so that A≠B. In this case, parts of the desired signal will be removed and parts of an adjacent channel will be introduced.

SUMMARY

In accordance with one aspect of the present invention, the foregoing and other objects are achieved in a log polar digital filter for processing a digitized log polar signal that comprises a logarithmically-scaled magnitude signal ($r_{in}$) and an angle signal ($PHI_{in}$). In one embodiment, the log polar digital filter comprises first conversion means for converting the log polar signal into a converted linear Cartesian signal, wherein the converted linear Cartesian signal comprises an in-phase signal ($I_{in}$) and a quadrature signal ($Q_{in}$). The log polar digital filter further comprises a digital filter, referred to here as a linear Cartesian digital filter, that is coupled to the first conversion means, for generating a filtered linear Cartesian signal from the converted linear Cartesian signal. The linear Cartesian signal comprises an in-phase signal and a quadrature-phase signal.

In another aspect of the invention, the log polar digital filter further comprises an analog circuit for generating an analog signal, and a log polar digitizer for generating the digitized log polar signal from the analog signal. The first conversion means generates the converted linear Cartesian signal in accordance with the equations:

$$I_{in}=b_{in}^{(r_{in}-offset_{in})}*\cos(PHI_{in})$$

and $$Q_{in}=b_{in}^{(r_{in}-offset_{in})}*\sin(PHI_{in})$$

where $b_{in}$ and $offset_{in}$ are calibration constants. These calibration constants may be used to adapt the linearization of the characteristics of the log polar digitizer and to compensate for gain errors introduced in the analog circuit. The analog circuit may include, for example, an analog bandpass filter; and an analog amplifier, coupled to receive a filtered signal from the analog bandpass filter.

In another aspect of the invention, the linear Cartesian digital filter compensates for out-of-specification operation of the analog circuit.

In still another aspect of the invention, the log polar digital filter further comprises second conversion means, coupled to the linear Cartesian digital filter, for converting the filtered linear Cartesian signal into a filtered log polar signal, the filtered log polar signal comprising a filtered magnitude signal ($r_{filt}$) and a filtered angle signal ($PHI_{filt}$).

The log polar digital filter may still further comprise third means for further processing the filtered log polar signal. The second conversion means in this case may generate the filtered log polar signal in accordance with the equations:

$$r_{filt} = \frac{\log r'_{filt}}{\log b_{out}} + offset_{out}$$

and $$PHI_{filt}=\arg(I_{filt}+jQ_{filt})$$

where arg( ) denotes the argument of a complex number, $r'_{filt}=\sqrt{I^2_{filt}+Q^2_{filt}}$, and $b_{out}$ and $offset_{out}$ are constants that may be selected to cause the filtered log polar signal to satisfy range and resolution requirements of the third means.

In another embodiment of the invention, the first conversion means generates the converted linear Cartesian signal in accordance with the equations:

$$I_{in}=b_{in}^{(r_{in}-offset_{in})}*\cos(PHI_{in}+2\pi f_{corr}t)$$

and $$Q_{in} = b_{in}^{(r_{in}-\text{offset}_{in})} * \sin(PHI_{in} + 2\pi f_{corr} t)$$

where $b_{in}$ and $\text{offset}_{in}$ are calibration constants that may be used to adapt the linearization to the characteristics of the log polar digitizer and to compensate for gain errors introduced in the analog circuit, t is a time stamp of a current sample, and $f_{corr}$ is a frequency constant for correcting for asymmetrical frequency characteristics of the analog circuit. Also, the second means generates the filtered log polar signal in accordance with the equations:

$$r_{filt} = \frac{\log r'_{filt}}{\log b_{out}} + \text{offset}_{out}$$

and $$PHI_{filt} = (\arg(I_{filt} + jQ_{filt}) - 2\pi f_{corr} t) \text{ modulo } 2\pi$$

where $r'_{filt} = \sqrt{I^2_{filt} + Q^2_{filt}}$, and b__out and $\text{offset}_{out}$ are constants that may be selected to cause the filtered log polar signal to satisfy range and resolution requirements of the third means. The constant $f_{corr}$ may be selected to cause the linear Cartesian digital filter to move in frequency so as to compensate for badly centered analog filter characteristics.

BRIEF DESCRIPTION OF THE DRAWINGS

The objects and advantages of the invention will be understood by reading the following detailed description in conjunction with the drawings in which.

DETAILED DESCRIPTION

Figure 1:
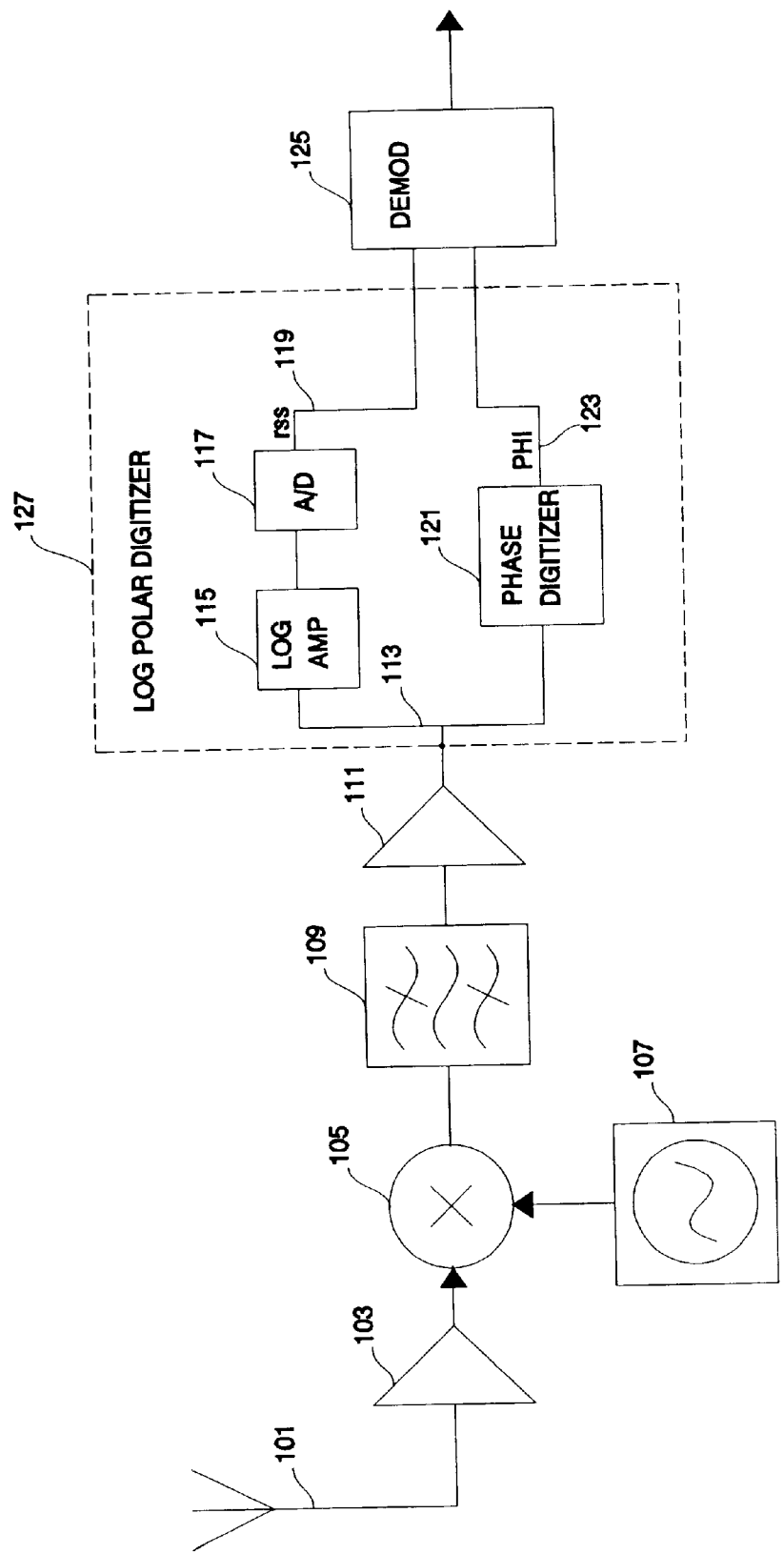
FIG. 1 is a block diagram of a conventional log polar receiver.

The various features of the invention will now be described with respect to the figures, in which like parts are identified with the same reference characters.

Figure 3:
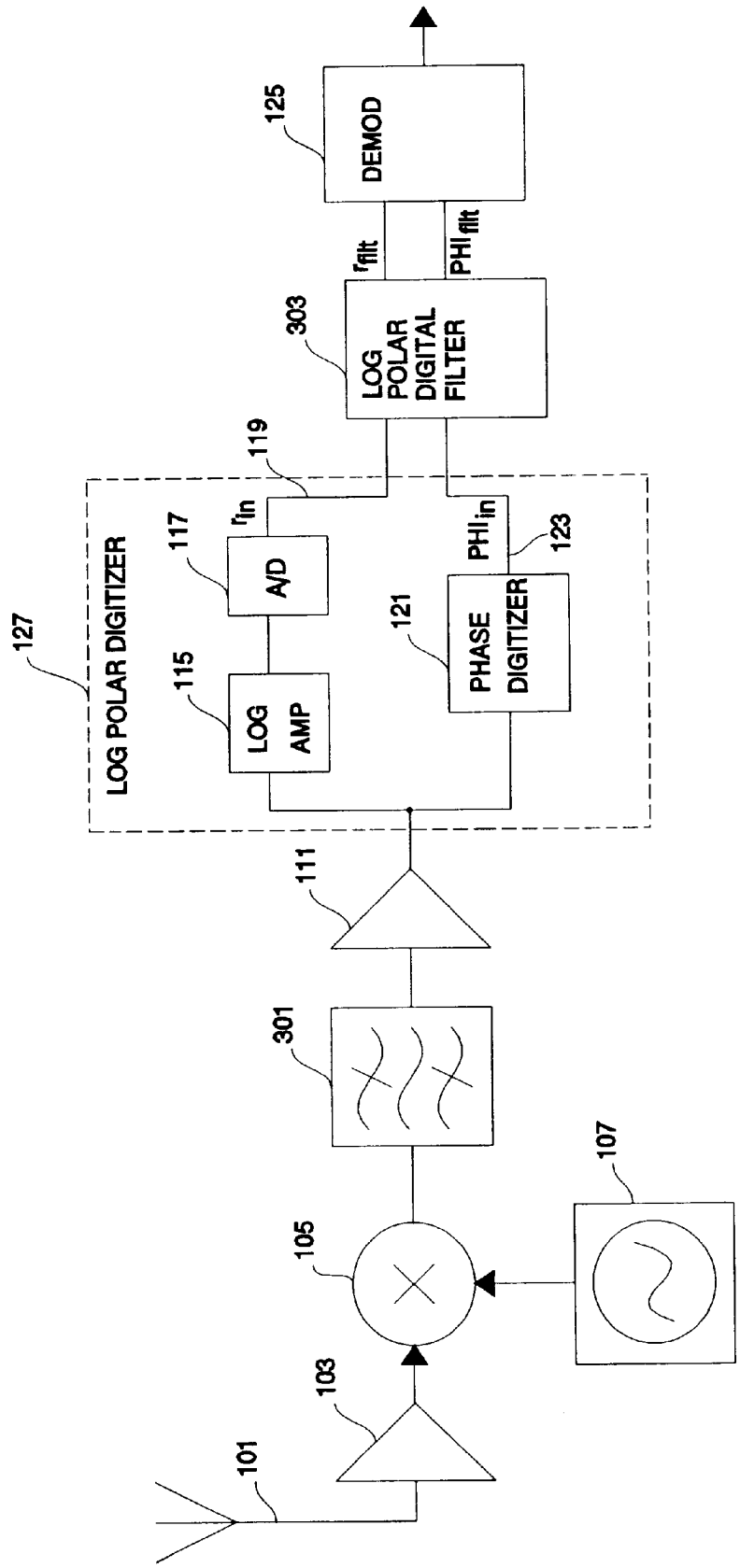
FIG. 3 is a block diagram of an exemplary log polar receiver in accordance with one aspect of the invention.

FIG. 3 is a block diagram of an exemplary log polar receiver in accordance with one aspect of the invention. The antenna 101, amplifiers 103 and 111, mixer 105, local oscillator 107, logarithmic amplifier 115, A/D converter 117, phase digitizer 121 and demodulator 125 operate the same as those described above with respect to FIG. 1, so no additional description is necessary. In a preferred embodiment, the log polar digitizer 127 is that which is described in greater detail in U.S. Pat. No. 5,048,059 to P. Dent, which is incorporated herein by reference.

Figure 2:
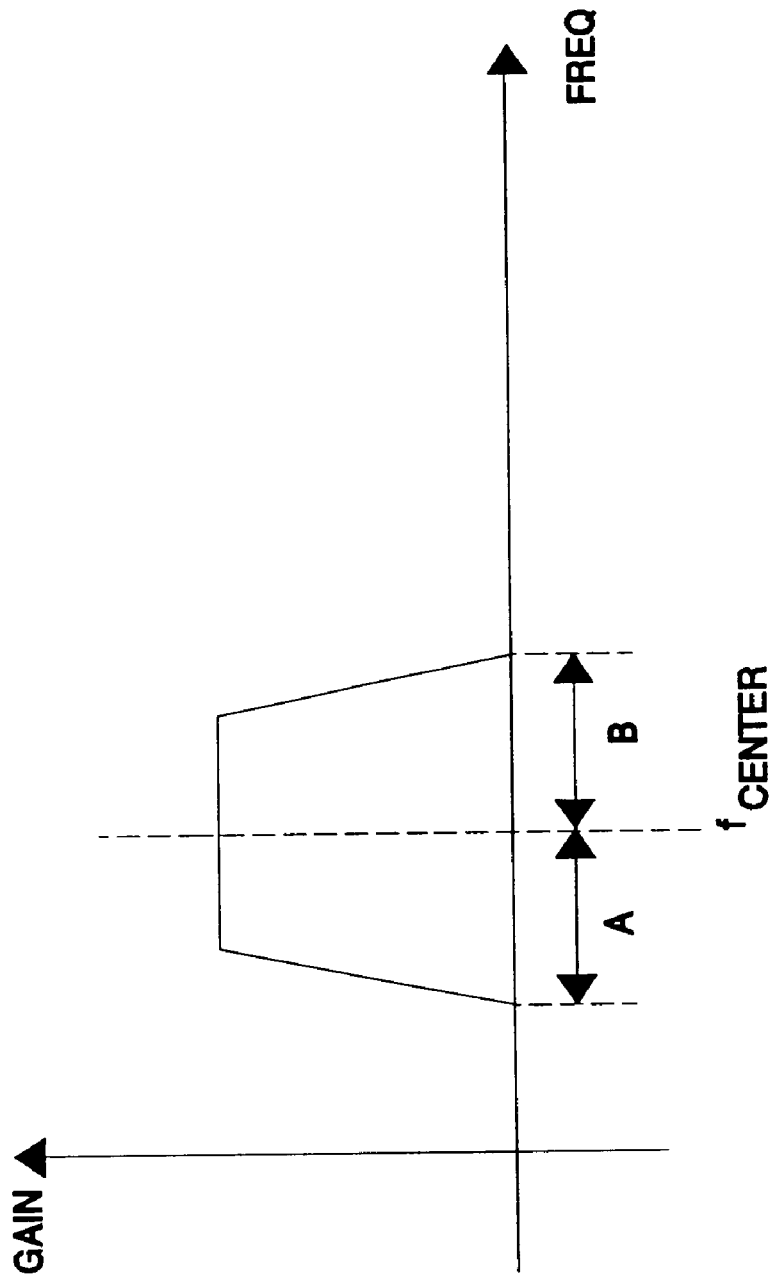
FIG. 2 is a graph of the frequency characteristics of a bandpass filter.

The function of the bandpass filter 301 is the same as that of the bandpass filter 109 described above. However, in accordance with one aspect of the invention, the bandpass filter 301 need not operate under the same exacting standards as that of the bandpass filter 109 because of the addition of a log polar digital filter 303, by which is meant means that utilize digital techniques to filter a digitized log polar signal. The coefficients of the log polar digital filter 303 are preferably loadable, so that different sets may be used for:

1) compensating for different filter characteristics of the analog parts of the receiver. For example, if the bandwidth (A+B; see FIG. 2) of the bandpass filter 301 is too wide, then coefficients for the log polar digital filter 303 should be selected to produce a narrow bandwidth that, when following the bandpass filter 301, will produce the desired bandwidth. Similarly, if the bandwidth (A+B; see FIG. 2) of the bandpass filter 301 is too narrow, then coefficients for the log polar digital filter 303 should be selected to produce a wider bandwidth that, when following the bandpass filter 301, will produce the desired bandwidth.

2) compensating for a bandpass filter 301 that is not symmetrical, that is, one whose center frequency ($f_{CENTER}$; see FIG. 2) is not actually on the desired intermediate frequency (I.F.).

3) adjusting the total filter characteristics of the circuit to satisfy the overall requirements of the application.

Techniques for making the above-described compensations and adjustments are described in greater detail below.

It will be observed that the log polar digital filter 303 is required to process signals that are in log polar form. In accordance with another aspect of the invention, the log polar digital filter 303 has this capability. An exemplary embodiment of the log polar digital filter 303 will now be described with respect to FIG. 4.

Within the exemplary log polar digital filter 303, the log polar signals to be processed (i.e., the digital signals $r_{in}$ 119 and $PHI_{in}$ 123) are supplied to means for converting signals from log polar form into Cartesian form. Such means, depicted in FIG. 4 as the log polar-to-Cartesian converter 401, may be implemented, for example, as an application specific integrated circuit (ASIC) or other hardwired circuit, or alternatively as software running on a programmable device. In either case, the log polar-to-Cartesian converter 401 generally operates in accordance with the following equations in order to generate the linear Cartesian form input signals, $I_{in}$ 403 and $Q_{in}$ 405, from the log polar signals $r_{in}$ 119 and $PHI_{in}$ 123:

$$I_{in} = b_{in}^{(r_{in}-\text{offset}_{in})} * \cos(PHI_{in}) = r'_{in} * \cos(PHI_{in}) \quad (1)$$

$$Q_{in} = b_{in}^{(r_{in}-\text{offset}_{in})} * \sin(PHI_{in}) = r'_{in} * \sin(PHI_{in}) \quad (2)$$

where $b_{in}$ and $\text{offset}_{in}$ are calibration constants that may be used to adapt the linearization to the characteristics of the log polar digitizer 127 and to compensate for gain and offset errors that may arise due to imperfections and variations in the analog parts of the radio.

In one embodiment, the signal $r_{in}$ 119 comprises 10-bit samples (capable of representing values in the range from 0 to 1023), and $PHI_{in}$ 123 comprises 8-bit samples in the range from 0 to 255. Since Equations (1) and (2) above assume that the phase value is in radians, these equations must be slightly modified as follows, in order to accommodate the 8-bit representation of $PHI_{in}$ 123:

$$I_{in} = b_{in}^{(r_{in}-\text{offset}_{in})} * \cos(2\pi * PHI_{in}/256) = r'_{in} * \cos(2\pi * PHI_{in}/256) \quad (1')$$

$$Q_{in} = b_{in}^{(r_{in}-\text{offset}_{in})} * \sin(2\pi * PHI_{in}/256) = r'_{in} * \sin(2\pi * PHI_{in}/256) \quad (2')$$

where $$r'_{in} = b_{in}^{(r_{in}-\text{offset}_{in})} \quad (3)$$

In one embodiment, the constants $b_{in}$ and $\text{offset}_{in}$ are preferably stored in registers within the log polar-to-Cartesian converter 401, so that they may be software loadable.

It is noted that values for $r'_{in}$ may be computed from equation (3) by means of fixed point arithmetic. However, when floating point arithmetic is utilized, the determination of values for $r'_{in}$ may be made more efficient by means of the following techniques in accordance with another aspect of the invention. First, it is noted that $$r'_{in} = b_{in}^{(r_{in} - \textit{offset}_{in})} = 2^{(-(\textit{offset}_{in} - r_{in})*\log_2 b_{in})} \quad (4)$$

In floating point arithmetic, each value is represented in the form: mantissa*$2^{exponent}$. Consequently, equation (4) leads to the following formula for determining the linear value $r'_{in}$:

$$r'_{in} = 2^{(-integer((r'_{in} + (-\textit{offset}_{in}))*(-\log_2 b_{in}) - \textit{frac}((r_{in} + (-\textit{offset}_{in}))*(-\log_2 b_{in})))} \quad (5)$$

$$= 2^{(exponent)} * 2^{(-\textit{frac}((r_{in} + (-\textit{offset}_{in}))*(-\log_2 b_{in}))}$$

The last exponential in equation (5), that is the expression $2^{(-\textit{fzac}((r_{in} + (-\textit{offset}_{in}))*(-\log_2 b_{in})))}$, may be computed by letting $x=\text{frac}((r_{in}+(-\textit{offset}_{in}))*(-\log_2 b_{in}))$, and applying a Tschebyscheff expansion for the function $2^{-x}$, namely:

$$P(x) = C_7 * x^7 + \ldots + C_1 * x^1 + C_0 * x^0 \quad (6)$$

The coefficients $C_7, C_6, \ldots, C_1, C_0$ are the polynomial coefficients in a Tschebyscheff expansion, and should be selected to provide good results for the expected range of values of $r_{in}$. Although eight terms are illustrated, the number of terms in the polynomial depends on the level of accuracy that is required for the given application.

It can be seen that the operation of the log polar-to-Cartesian converter 401 depends on the values that are selected for $b_{in}$ and $\textit{offset}_{in}$. In yet another aspect of the invention, these values may be selected as a function of the radio dynamics as follows: First, the variable $r'_{in}$ is written as a function of the signal $r_{in}$ 119:

$$r'_{in}(r_{in}) = b_{in}^{(r_{in} - \textit{offset}_{in})} \quad (7)$$

Expressing $r'_{in}$ in decibels (dB), we get:

$$r_{db}(r_{in}) = 20*(r_{in} - \textit{offset}_{in})*\log_{10} b_{in} \quad (8)$$

Taking the derivative of both sides and rearranging variables yields the following expressions for $b_{in}$ and $\log_2 b_{in}$:

$$\frac{d(r_{dB})}{d(r_{in})} = 20 * \log_{10} b_{in} \quad (9)$$

$$b_{in} = 10^{\frac{d(r_{dB})}{d(r_{in})*20}}$$

$$\log_2 b_{in} = \frac{d(r_{dB})*\log_2 10}{d(r_{in})*20}$$

where $$\frac{d(r_{dB})}{d(r_{in})}$$

is the signal strength of r (in dB) per $r_{in}$ step. This value may be determined empirically for each radio unit by making measurements during production, using well-known techniques.

Having determined a suitable value for $b_{in}$ (and, therefore, $\log_2 b_{in}$ as well), one can determine a corresponding value for $\textit{offsets}_{in}$ as follows:

$$r_{in}(0) = b_{in}^{0 - \textit{offset}_{in}} \quad (10)$$

$$r_{dB} = -20 * \textit{offset}_{in} * \log_{10} b_{in}$$

$$\textit{offset}_{in} = \frac{-r_{dB}(0)}{20 * \log_{10} b_{in}} = \frac{-r_{dB}(0) * \log_2 10}{20 * \log_2 b_{in}}$$

Thus, in a preferred embodiment, values for $-\log_2 b_{in}$ and $-\textit{offset}_{in}$ are predetermined for a given log polar-to-Cartesian converter 401, and these values are programmed into a memory means located in the log polar-to-Cartesian converter 401. During operation of the log polar-to-Cartesian converter 401, equation (5) is used to determine a value for $r_{in}$ from the pre-stored values of $-\log_2 b_{in}$ and $-\textit{offset}_{in}$ and from the input values of the signal $r_{in}$ 119.

The cosine and sine of the phase (see equations (1') and (2')) may be determined in accordance with well-known table-lookup techniques. However, in another embodiment, the cosine of the phase is computed by applying a Tschebyscheff expansion of the function $\cos(\text{pi}*x)$ to a suitable normalization of the phase. Mathematically, $$\cos(2*\pi*PHI_{in}/256) = -\cos(\pi*(PHI_{in} - 128)/128)$$

and the polynomial $$P(x) = C_5 * x^{10} + C_4 * x^8 + \ldots + C_0 * x^0$$

is applied to $((PHI_{in} - 128)/128)$.

The computation of the imaginary part is entirely analogous; $\sin(\text{pi}*x)$ is approximated by the polynomial $$P(x) = x(K_4 * x^8 + K_3 * x^6 + \ldots + K_0 * x^0).$$

The coefficients for the polynomial expressions should be determined to provide good approximations for the expected range of input values. Techniques for selecting coefficients to satisfy the criterion are well known in the art. Also, when $PHI_{in}$ equals 0, 64 or 192 (i.e., those angles that should have zero cos or sin values, but which generate non-zero values when the polynomial is computed), the log polar-to-Cartesian converter 401 may skip the step of evaluating the polynomial, and instead merely use the accurate answer of zero.

Referring back to FIG. 4, the log polar digital filter 303 further includes a digital filter, henceforth referred to throughout this specification as a linear Cartesian digital filter 407 that receives the $I_{in}$ and $Q_{in}$ signals 403 and 405 that are generated by the log polar-to-Cartesian converter 401, and generates therefrom filtered signals $I_{filt}$ 409 and $Q_{filt}$ 411. The linear Cartesian digital filter 407 may be any type of digital filter (e.g., finite impulse response (FIR) or infinite impulse response (IIR)) that meets the requirements of the receiver. One aspect of the linear Cartesian digital filter 407 is that it may have two independent filter paths, so that the signals $I_{in}$ 403 and $Q_{in}$ 405 may be processed separately. Techniques for designing linear Cartesian digital filters are well-known in the art, and are application specific. Accordingly, a more detailed description of the linear Cartesian digital filter 407 is beyond the scope of the invention.

In one aspect of the invention, the coefficients of the linear Cartesian digital filter 407 are loadable, and different sets of coefficients may be used to compensate for out-of-specification filter characteristics of the analog parts of the radio. The term "out-of-specification operation" is used here to mean actual operation that is not in accordance with the intended operation. As explained in the BACKGROUND section of this specification, although two different analog circuits may be built with the same nominal components, imperfections and variations of components during construction, as well as variations that arise as a result of aging of the components, will cause the circuits to exhibit different characteristics in operation.

One example of compensation that the linear Cartesian digital filter 407 can provide is illustrated by the case where the bandwidth of the bandpass filter 301 is found to be too wide. In this instance, the coefficients of the linear Cartesian digital filter 407 may be selected to effect a bandpass filter having a narrow bandwidth, so that the sum total of filtering satisfies the requirements of the specification. Similarly, if the bandwidth of the bandpass filter 301 is found to be too narrow, then coefficients of the linear Cartesian digital filter 407 may be selected to effect a bandpass filter having a wide bandwidth. In each case, the net effect of the series connected filters should produce the desired filtering that would otherwise be performed by the analog bandpass filter 301 alone.

The coefficients of the linear Cartesian digital filter 407 may further be selected to adjust the total filter characteristics so as to satisfy the total filter characteristics of the intended application (in this case, a receiver). In this case, coefficients are selected by considering not only the actual performance of the analog bandpass filter 301, but also the performance of filters that receive signals derived from the output of the linear Cartesian digital filter 407.

By making the coefficients of the linear Cartesian digital filter 407 software loadable, different sets of coefficients may be used for different applications. For example, one set may be loaded for an application requiring high adjacent channel rejection, while another set may be utilized if no adjacent channel interferers are present.

Figure 4:
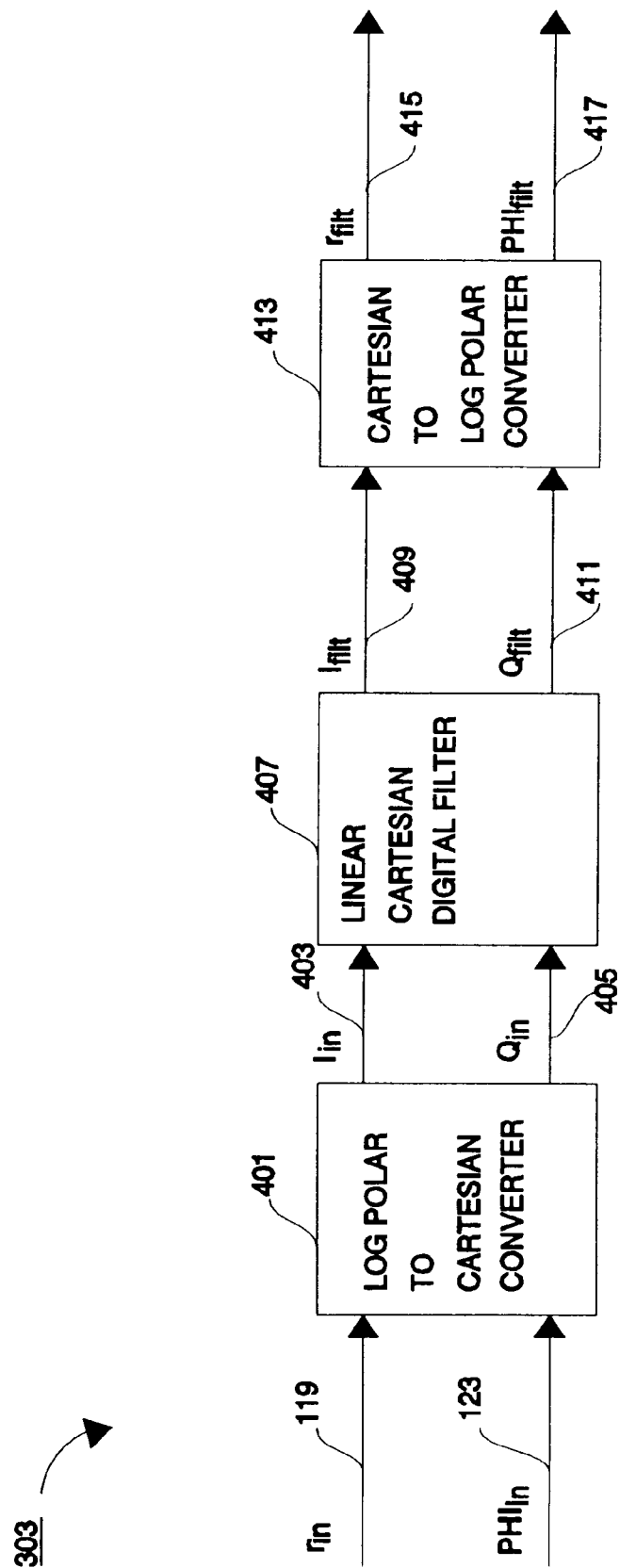
FIG. 4 is a block diagram of an exemplary embodiment of the log polar digital filter in accordance with the invention.

The filtered signals $I_{filt}$ 409 and $Q_{filt}$ 411 that are generated by the linear Cartesian digital filter 407 may, in some embodiments, be directly supplied to other components in the receiver for further processing. In the illustrative embodiment, however, it is necessary for these signals to first be converted back into log polar form before they can be supplied to other components in the receiver. Consequently, the log polar digital filter 303 further includes means for converting Cartesian form signals into log polar form. Such means may be alternatively constructed in a number of different ways, including as an ASIC or as a general purpose processor running a conversion program. The conversion means are represented in FIG. 4 as the Cartesian-to-log polar converter 413, which receives the filtered signals $I_{filt}$ 409 and $Q_{filt}$ 411, and generates therefrom the filtered signals $r_{filt}$ 415 and $PHI_{filt}$ 417.

The filtered phase signal $PHI_{filt}$ 417 may be determined in accordance with the equation $$PHI_{filt} = \arg(I_{filt} + jQ_{filt}) \tag{11}$$

where arg( ) denotes the argument of a complex number.

A filtered magnitude signal may also be determined in accordance with a well known linear-to-log polar conversion algorithm. However, in accordance with another aspect of the invention, the Cartesian-to-log polar converter 413 not only converts the filtered signals, $I_{filt}$ 409 and $Q_{filt}$ 411, into log polar form, but may also scale the filtered signals, $r_{filt}$ 415 and $PHI_{filt}$ 417, so that they will have a resolution and range suitable for the signal processing that follows (e.g., a Viterbi equalizer). This scaling may be accomplished by adjusting the filtered signal $r_{filt}$ 415 in accordance with the equation:

$$r'_{filt} = b_{out}^{(r_{filt} - offset_{out})} \tag{12}$$

where $r'_{filt} = \sqrt{I^2_{filt} + Q^2_{filt}}$ is a linearly scaled polar magnitude value, and $b_{out}$ and $offset_{out}$ are constants that are preferably capable of being loaded into the Cartesian-to-log polar converter 413 by means of a software download operation.

In accordance with yet another aspect of the invention, the Cartesian-to-log polar converter 413 is designed to efficiently convert and scale the filtered signal by taking advantage of the fact that the filtered signals, $I_{filt}$ 409 and $Q_{filt}$ 411, are preferably represented in a floating point format. It follows from equation (12) that $$\begin{aligned}
r_{filt} &= \log_{b_{out}} r'_{filt} + offset_{out} \\
&= \frac{1}{2}\log_{b_{out}}(I_{filt} * I_{filt} + Q_{filt} * Q_{filt}) + offset_{out} \\
&= \frac{\log_2(I_{filt} * I_{filt} + Q_{filt} * Q_{filt})}{2\log_2 b_{out}} + offset_{out} \\
&= K * \log_2(I_{filt} * I_{filt} + Q_{filt} * Q_{filt}) + offset_{out}
\end{aligned} \tag{13}$$

It is observed that, in a preferred embodiment, $I_{filt}$ and $Q_{filt}$ are represented in floating point format, so that $$I_{filt} * I_{filt} + Q_{filt} * Q_{filt} = m * 2^{exponent} \tag{14}$$

where m is a mantissa in the range $\frac{1}{2} \leq m < 1$, and exponent is represented as an integer value. It follows, then, that $$\log_2(I_{filt} * I_{filt} + Q_{filt} * Q_{filt}) = \log_2(m * 2^{exponent}) = \log_2 m + exponent \tag{15}$$

In a preferred embodiment, $\log_2 m$ is approximated by $P(2*(1-m))$, where $$P(x) = c_{10} * x^{10} + \ldots + c_1 * x^1 + c_0 * x^0$$

The coefficients $c_{10}, \ldots, c_1, c_0$ should be selected in accordance with known techniques to optimize the polynomial expansion to give a good approximation for the expected range of input values.

A value for K may be selected for use in equation (13) by solving equation (12) for $b_{out}$:

$$b_{out} = 10^{\frac{d(r_{dB})}{d(r_{filt})*20}} \tag{16}$$

where, $$\frac{d(r_{dB})}{d(r_{filt})}$$

is a desired signal strength of r (in dB) per $r_{filt}$ step.

It follows from equation (16) that $$\log_2 b_{out} = \frac{d(r_{dB}) * \log_2 10}{d(r_{filt}) * 20} \tag{17}$$

The constant K can now be calculated as:

$$K = \frac{1}{2 * \log_2 b_{out}} = \frac{10}{\log_2 10 * \left(\frac{d(r_{dB})}{d(r_{filt})}\right)} \tag{18}$$

Having determined a value for K, a value for $offset_{out}$ can be calculated as:

$$offset_{out} = r_{filt} - \log_{b_{out}} r'_{filt} \quad (19)$$

$$= r_{filt} - \frac{\log_2 r'_{filt}}{\log_2 b_{out}}$$

$$= r_{filt} - 2*K*\log_2 r'_{filt}$$

$$= r_{filt} - 2*K*\log_2 \sqrt{I_{filt}^2 + Q_{filt}^2}$$

In a preferred embodiment, the constants K and $offset_{out}$ are software loadable into the Cartesian-to-log polar converter 413.

In another aspect of the invention, the filtered signal $PHI_{filt}$ 417 is generated from the filtered signals, $I_{filt}$ 409 and $Q_{filt}$ 411, by first reducing these values to the case where both $I_{filt}$ and $Q_{filt}$ are positive, with $Q_{filt}$ being less than or equal to $I_{filt}$. Then, the ratio $Q_{filt}/I_{filt}$ is supplied as an input to a polynomial approximation of the function arctan (x), thereby yielding a value for $PHI_{filt}$, modulo the reduction made to bring $I_{filt}$ and $Q_{filt}$ into the desired range. Consequently, the value for $PHI_{filt}$ must be adjusted to produce an accurate filtered signal $PHI_{filt}$ 417. The polynomial approximation that is used is preferably of degree 7.

When utilizing the log polar digital filter 303 to compensate for variations of the characteristics of the analog bandpass filter 301 (and/or any other filters that may be present, depending on the application), it becomes apparent that the analog filters are not symmetrical. That is, the actual center frequency for filtering is not the desired center frequency. In accordance with another aspect of the invention, this problem is corrected by introducing an intentional frequency offset in the log polar-to-Cartesian converter 401 and in the Cartesian-to-log polar converter 413.

More specifically, the log polar-to-Cartesian converter 401 is, in this case, designed to perform its conversion in accordance with the following relationships:

$$I_{in} = b_{in}^{(r_{in} - offset_{in})} * \cos(PHI_{in} + 2\pi f_{corr} t) \quad (20)$$

and $$Q_{in} = b_{in}^{(r_{in} - offset_{in})} * \sin(PHI_{in} + 2\pi f_{corr} t) \quad (21)$$

where $r_{in}$, $offset_{in}$, $b_{in}$ and $PHI_{in}$ are the same as described above (with $PHI_{in}$ assumed to be expressed in radians).

Similarly, the Cartesian-to-log polar converter 413 is designed to perform its conversion in accordance with the following relationships:

$$r_{filt} = K * \log_2(I_{filt}^2 + Q_{filt}^2) + offset_{out} \quad (22)$$

and $$PHI_{filt} = (\arg(I_{filt} + jQ_{filt}) - 2\pi f_{corr} t) \bmod 2\pi \quad (23)$$

In this case, the only difference in operation from that which has been previously described is the introduction of the compensation factor, $2\pi f_{corr} t$, where $f_{corr}$ is the correction frequency, and t is the time stamp of the current sample.

A suitable value for $f_{corr}$ may be empirically determined by supplying the log polar digital filter 303 with a signal having the same bandwidth and center frequency that will be used when the system is later used in the field. The parameter $f_{corr}$ is then adjusted to maximize the output signal, $r_{filt}$.

The invention has been described with reference to a particular embodiment. However, it will be readily apparent to those skilled in the art that it is possible to embody the invention in specific forms other than those of the preferred embodiment described above. This may be done without departing from the spirit of the invention. For example, in the illustrative embodiments, the log polar signals were received radio signals having received signal strength and phase components. However, the invention is not limited to this embodiment, but rather may be applied for filtering any type of log polar signal, that is, one comprising a magnitude signal and an angle signal, with the magnitude signal being scaled logarithmically.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A log polar digital filter for processing a digitized log polar signal that comprises a logarithmically scaled magnitude signal ($r_{in}$) and an angle signal ($PHI_{in}$), the log polar digital filter comprising:

first conversion means for converting the digitized log polar signal into a converted linear Cartesian signal, wherein the converted linear Cartesian signal comprises an in-phase signal ($I_{in}$) and a quadrature signal ($Q_{in}$);

a linear Cartesian digital filter, coupled to the first means, for generating a filtered linear Cartesian signal from the converted linear Cartesian signal;

an analog circuit for generating an analog signal; and a log polar digitizer for generating the digitized log polar signal from the analog signal, and wherein the first conversion means generates the converted linear Cartesian signal in accordance with the equations:

$$I_{in} = b_{in}^{(r_{in} - offset_{in})} * \cos(PHI_{in})$$

and $$Q_{in} = b_{in}^{(r_{in} - offset_{in})} * \sin(PHI_{in})$$

where $b_{in}$ and $offset_{in}$ are calibration constants.

2. The log polar digital filter of claim 1, wherein the calibration constants $b_{in}$ and $offset_{in}$ are selected to adapt a linearization of $r_{in}$ to characteristics of the log polar digitizer, and to compensate for gain errors introduced in the analog circuit.

3. The log polar digital filter of claim 1, wherein the analog circuit comprises:

an analog bandpass filter; and an analog amplifier, coupled to receive a filtered signal from the analog bandpass filter.

4. The log polar digital filter of claim 1, wherein the linear Cartesian digital filter compensates for out-of-specification operation of the analog circuit.

5. The log polar digital filter of claim 4, wherein the linear Cartesian digital filter includes loadable storage means for storing filter coefficients.

6. The log polar digital filter of claim 1, wherein the calibration constants $b_{in}$ and $offset_{in}$ are selected as a function of radio dynamics.

7. The log polar digital filter of claim 1, wherein the calibration constants $b_{in}$ and $offset_{in}$ are determined empirically by making measurements on the analog circuit.

8. The log polar digital filter of claim 1, wherein the first conversion means includes means for storing the calibration constants $b_{in}$ and $offset_{in}$.

9. A log polar digital filter for processing a digitized log polar signal that comprises a logarithmically scaled magnitude signal ($r_{in}$) and an angle signal ($PHI_{in}$), the log polar digital filter comprising:

first conversion means for converting the digitized log polar signal into a converted linear Cartesian signal, wherein the converted linear Cartesian signal comprises an in-phase signal ($I_{in}$) and a quadrature signal ($Q_{in}$);

a linear Cartesian digital filter, coupled to the first means, for generating a filtered linear Cartesian signal from the converted linear Cartesian signal;

second conversion means, coupled to the linear Cartesian digital filter, for converting the filtered linear Cartesian signal into a filtered log polar signal, the filtered log polar signal comprising a filtered magnitude signal ($r_{filt}$) and a filtered angle signal ($PHI_{filt}$); and third means for further processing the filtered log polar signal, and wherein the second conversion means generates the filtered log polar signal in accordance with the equations:

$$r_{filt} = \frac{\log r'_{filt}}{\log b_{out}} + \text{offset}_{out}$$

and $$PHI_{filt} = \arg(I_{filt} + jQ_{filt})$$

where $r'_{filt} = \sqrt{I^2_{filt} + Q^2_{filt}}$, and $b_{out}$ and $\text{offset}_{out}$ are calibration constants.

10. The log polar digital filter of claim 9, wherein the calibration constants $b_{out}$ and $\text{offset}_{out}$ are selected to cause the filtered log polar signal to satisfy range and resolution requirements of the third means.

11. The log polar digital filter of claim 9, further comprising:

an analog circuit for generating an analog signal; and a log polar digitizer for generating the digitized log polar signal from the analog signal, and wherein the first conversion means generates the converted linear Cartesian signal in accordance with the equations:

$$I_{in} = b_{in}^{(r_{in} - \text{offset}_{in})} * \cos(PHI_{in} + 2\pi f_{corr} t)$$

and $$Q_{in} = b_{in}^{(r_{in} - \text{offset}_{in})} * \sin(PHI_{in} + 2\pi f_{corr} t)$$

where $b_{in}$ and $\text{offset}_{in}$ are calibration constants that are used to compensate for gain errors introduced in the analog circuit, t is a time stamp of a current sample, and $f_{corr}$ is a frequency constant for correcting for asymmetrical operation of the analog circuit, and wherein further, the second conversion means generates the filtered log polar signal in accordance with the equations:

$$r_{filt} = \frac{\log r'_{filt}}{\log b_{out}} + \text{offset}_{out}$$

and $$PHI_{filt} = (\arg(I_{filt} + jQ_{filt}) - 2\pi f_{corr} t) \text{modulo} 2\pi$$

where $r'_{filt} = \sqrt{I^2_{filt} + Q^2_{filt}}$, and $b_{out}$ and $\text{offset}_{out}$ are constants that cause the filtered log polar signal to satisfy range and resolution requirements of the third means.

12. A method for processing a digitized log polar signal that comprises a logarithmically scaled magnitude signal ($r_{in}$) and an angle signal (PHI__in), the method comprising the steps of:

converting the digitized log polar signal into a converted linear Cartesian signal, wherein the converted linear Cartesian signal comprises an in-phase signal ($I_{in}$) and a quadrature signal ($Q_{in}$);

generating a filtered linear Cartesian signal from the converted linear Cartesian signal;

using an analog circuit to generate an analog signal; and generating the digitized log polar signal from the analog signal, and wherein the step of converting the digitized log polar signal into a converted linear Cartesian signal is in accordance with the equations:

$$I_{in} = b_{in}^{(r_{in} - \text{offset}_{in})} * \cos(PHI_{in})$$

and $$Q_{in} = b_{in}^{(r_{in} - \text{offset}_{in})} * \sin(PHI_{in})$$

where $b_{in}$ and $\text{offset}_{in}$ are calibration constants.

13. The method of claim 12, wherein the calibration constants $b_{in}$ and $\text{offset}_{in}$ are selected to adapt a linearization of $r_{in}$ to characteristics of the step of generating the digitized log polar signal, and to compensate for gain errors introduced in the analog circuit.

14. The method of claim 12, wherein the step of using the analog circuit to generate the analog signal comprises the steps of:

using an analog bandpass filter to filter a received signal; and using an analog amplifier to generate the analog signal from the filtered received signal.

15. The method of claim 12, wherein the step of generating the filtered linear Cartesian signal from the converted linear Cartesian signal includes compensating for out-of-specification operation of the analog circuit.

16. The method of claim 15, wherein the step of generating the filtered linear Cartesian signal includes the steps of:

receiving and storing filter coefficients in a loadable storage means;

using the stored filter coefficients to generate the filtered linear Cartesian signal from the converted linear Cartesian signal.

17. The method of claim 12, further comprising the step of selecting the calibration constants $b_{in}$ and $\text{offset}_{in}$ as a function of radio dynamics.

18. The method of claim 12, further comprising the step of empirically determining the calibration constants $b_{in}$ and $\text{offset}_{in}$ by making measurements on the analog circuit.

19. The method of claim 12, further comprising the steps of:

receiving and storing the calibration constants $b_{in}$ and $\text{offset}_{in}$ into storage means; and using the stored calibration constants to convert the digitized log polar signal into the converted linear Cartesian signal.

20. A method for processing a digitized log polar signal that comprises a logarithmically scaled magnitude signal ($r_{in}$) and an angle signal (PHI__in), the method comprising the steps of:

converting the digitized log polar signal into a converted linear Cartesian signal, wherein the converted linear Cartesian signal comprises an in-phase signal ($I_{in}$) and a quadrature signal ($Q_{in}$);

generating a filtered linear Cartesian signal from the converted linear Cartesian signal;

converting the filtered linear Cartesian signal into a filtered log polar signal, the filtered log polar signal comprising a filtered magnitude signal ($r_{filt}$) and a filtered angle signal ($PHI_{filt}$); and using means for further processing the filtered log polar signal, and wherein the step of generating the filtered log polar signal is performed in accordance with the equations:

$$r_{filt} = \frac{\log r'_{filt}}{\log b_{out}} + \mathit{offset}_{out}$$

and $$PHI_{filt} = \arg(I_{filt} + jQ_{filt})$$

where $r'_{filt} = \sqrt{I^2_{filt} + Q^2_{filt}}$, and $b_{out}$ and $\mathit{offset}_{out}$ are calibration constants.

21. The method of claim 20 wherein the calibration constants $b_{out}$ and $\mathit{offset}_{out}$ are selected to cause the filtered log polar signal to satisfy range and resolution requirements of the further processing means.

22. The method of claim 20, further comprising the steps of:

using an analog circuit to generate an analog signal; and generating the digitized log polar signal from the analog signal, and wherein the step of converting the digitized log polar signal into the converted linear Cartesian signal is performed in accordance with the equations:

$$I_{in} = b_{in}^{(r_{in} - \mathit{offset}_{in})} * \cos(PHI_{in} + 2\pi f_{corr} t)$$

and $$Q_{in} = b_{in}^{(r_{in} - \mathit{offset}_{in})} * \sin(PHI_{in} + 2\pi f_{corr} t)$$

where $b_{in}$ and $\mathit{offset}_{in}$ are calibration constants that are used to compensate for gain errors introduced in the analog circuit, t is a time stamp of a current sample, and $f_{corr}$ is a frequency constant for correcting for asymmetrical operation of the analog circuit, and wherein further, the step of converting the filtered linear Cartesian signal into the filtered log polar signal is performed in accordance with the equations:

$$r_{filt} = \frac{\log r'_{filt}}{\log b_{out}} + \mathit{offset}_{out}$$

and $$PHI_{filt} = (\arg(I_{filt} + jQ_{filt}) - 2\pi f_{corr} t) \bmod 2\pi$$

where $r'_{filt} = \sqrt{I^2_{filt} + Q^2_{filt}}$, and $b_{out}$ and $\mathit{offset}_{out}$ are constants that cause the filtered log polar signal to satisfy range and resolution requirements of the further processing means.

* * * * *